(12) United States Patent
Seljavaara

(10) Patent No.: US 7,944,456 B2
(45) Date of Patent: May 17, 2011

(54) CONTENT OPTIMIZATION FOR RECEIVING TERMINALS

(75) Inventor: Petri Seljavaara, Espoo (FI)

(73) Assignee: Lumi Interactive Ltd, Espoo (FI)

( * ) Notice: Subject to any disclaimer, the term of this patent is extended or adjusted under 35 U.S.C. 154(b) by 279 days.

(21) Appl. No.: 11/816,208

(22) PCT Filed: Feb. 15, 2006

(86) PCT No.: PCT/FI2006/000051
§ 371 (c)(1),
(2), (4) Date: Aug. 19, 2008

(87) PCT Pub. No.: WO2006/087415
PCT Pub. Date: Aug. 24, 2006

(65) Prior Publication Data
US 2008/0316228 A1    Dec. 25, 2008

(30) Foreign Application Priority Data
Feb. 15, 2005   (FI) ................................. 20050171

(51) Int. Cl.
*G09G 5/00* (2006.01)
(52) U.S. Cl. ....... 345/660; 345/661; 345/667; 715/249; 715/762; 709/203; 709/219

(58) Field of Classification Search ................. 345/667, 345/744, 660–661; 715/500–525, 762, 249; 709/203–219
See application file for complete search history.

(56) References Cited

U.S. PATENT DOCUMENTS

| | | | |
|---|---|---|---|
| 6,345,279 B1 | 2/2002 | Li et al. | |
| 6,556,217 B1 * | 4/2003 | Makipaa et al. | 345/667 |
| 7,120,868 B2 * | 10/2006 | Salesin et al. | 715/249 |
| 7,346,668 B2 * | 3/2008 | Willis | 709/219 |
| 2002/0097263 A1 | 7/2002 | Fukuda | |
| 2002/0111969 A1 * | 8/2002 | Halstead, Jr. | 707/517 |
| 2003/0093473 A1 * | 5/2003 | Hara | 709/203 |
| 2003/0106022 A1 * | 6/2003 | Goodacre et al. | 715/513 |
| 2003/0179407 A1 * | 9/2003 | Herr | 358/1.18 |
| 2003/0195988 A1 | 10/2003 | Sahuc et al. | |
| 2003/0229845 A1 * | 12/2003 | Salesin et al. | 715/500 |
| 2004/0012627 A1 * | 1/2004 | Zakharia et al. | 345/744 |
| 2004/0117735 A1 | 6/2004 | Breen | |
| 2005/0055635 A1 * | 3/2005 | Bargeron et al. | 715/525 |
| 2006/0031749 A1 * | 2/2006 | Schramm et al. | 715/500.1 |
| 2007/0083810 A1 * | 4/2007 | Scott et al. | 715/525 |
| 2009/0024937 A1 * | 1/2009 | Lauff et al. | 715/762 |

* cited by examiner

*Primary Examiner* — Jin-Cheng Wang
(74) *Attorney, Agent, or Firm* — Young & Thompson

(57) ABSTRACT

The invention discloses a method, server and a computer program for optimizing content delivered to a variety of terminal devices. In the solution disclosed in the invention, a user is able to create exact layouts and optimize the amount of content to different media environments simultaneously.

30 Claims, 15 Drawing Sheets

| ☑ | mobile large | Width | Height | |
|---|---|---|---|---|
| | Dimensions (from): | 240 | 320 | pixels |
| | Dimensions (to): | 320 | 480 | pixels |
| | Smallest terminal: | SonyEricsson W900i | | |
| | Largest terminal: | SonyEricsson W900i | | |
| | Amount of terminals: | 2 | | |

| ☐ | mobile large / html | Width | Height | |
|---|---|---|---|---|
| | Dimensions (from): | 0 | 0 | pixels |
| | Dimensions (to): | 0 | 0 | pixels |

| ☐ | mobile wide / html | Width | Height | |
|---|---|---|---|---|
| | Dimensions (from): | 0 | 0 | pixels |
| | Dimensions (to): | 0 | 0 | pixels |

| ☑ | mobile medium | Width | Height | |
|---|---|---|---|---|
| | Dimensions (from): | 161 | 181 | pixels |
| | Dimensions (to): | 238 | 312 | pixels |
| | Smallest terminal: | Nokia 3650 | | |
| | Largest terminal: | SonyEricsson K750i | | |
| | Amount of terminals: | 10 | | |

| ☐ | mobile medium / html | Width | Height | |
|---|---|---|---|---|
| | Dimensions (from): | 0 | 0 | pixels |
| | Dimensions (to): | 0 | 0 | pixels |

| ☑ | mobile small | Width | Height | |
|---|---|---|---|---|
| | Dimensions (from): | 100 | 100 | pixels |
| | Dimensions (to): | 160 | 180 | pixels |
| | Smallest terminal: | Nokia 5140i | | |
| | Largest terminal: | Nokia 6170 | | |
| | Amount of terminals: | 6 | | |

| ☐ | mobile small / html | Width | Height | |
|---|---|---|---|---|
| | Dimensions (from): | 0 | 0 | pixels |
| | Dimensions (to): | 0 | 0 | pixels |

Fig. 2a

MCell Properties for 'Zone 1.1'

Name  [Zone 1.1]

Dimensions        width    height
  Smallest:  [240]    [320]    pixels
  Biggest:   [320]    [480]    pixels Grid spans        cols     rows
                  [1]      [1]

Margins           top      bottom
                  [0]      [0]       pixels
                  left     right
                  [0]      [0]       pixels Background color

[Remove color]

Background picture
Filename:                            [Choose]

[OK]  [cancel]

Content editing for 'My picture'

Horizontal alignment: [Center ⌄]
Vertical alignment: [Middle (default) ⌄]
Content type: [Picture ⌄]

Picture properties:
Picture: [Choose]
Mouseover: [Choose]

Border size: [0] pixels
Max. stretch: [5] %

MCell 'My picture' located in multiple targets, activate changes also in selected places:

☐ PcWeb
☐ TV
☐ MobileWebMed
☐ MobileWebSmall

[OK] [cancel]

Fig. 4

Import picture for zone 'Zone 1.1'

Files

Preview for: wrapit.jpg

[View...] [UPLOAD]

[IMPORT] [CLOSE]

☐ PcWeb
☐ MobileWebLarge
☐ MobileWebMed
☐ MobileWebSmall

Scale: [100] % Cropping box width: [100] px, height: [180] px [SET]

wrapit.jpg    Size: 5.41 kB    created:          accessed:
content type: image/jpeg    2005-05-07 13:31    2005-02-14 11:54
Colors: 24bit Picture size: Width: 183px Height: 230px Print (300dpi): 1.55*1.95 cm
Smallest
zone size:    Width: 120px Height: 160px Print (300dpi): 1.02*1.35 cm
Largest
zone size:    Width: 160px Height: 240px Print (300dpi): 2.03*2.03 cm

▼ |1|2|3|4| portrait-gNils.jpg    wrapit.jpg

Fig. 14

CONTENT OPTIMIZATION FOR RECEIVING TERMINALS

BACKGROUND OF THE INVENTION

1. Field of the Invention

The present invention relates to optimizing content delivered to a receiving terminal requesting the content. In particular, the present invention relates to a novel and improved method, server and computer program for creating exact layouts and optimizing the amount of content to different media environments simultaneously.

2. Description of the Related Art

There is a growing need for consumers and companies to be able to publish content in different media environments. However, currently creating and publishing multiple media content is hard or even impossible, for most people and businesses, because no individual can keep up with the pace of technological development and the different tools.

Designers and publishers of electronic content are facing new challenges in mobile editing and publishing. Mobile terminal displays are and will be of different size and quality, mainly because of ergonomic and economic reasons. For example, mobile phone manufacturer's display sizes vary from low-resolution monochromic displays, e.g. 84×48 pixel, to high-resolution high color displays, e.g. 640×320 pixel 16 bit displays.

Ergonomics in mobile phones means that mobile terminal sizes depend on the usage. Small phones should be as small as possible, at least fit into shirt pocket. Media phones need bigger screens but should still be operable with one hand. Personal digital assistants (PDA) can have even bigger displays than mobile phones and be operable with two hands (buy using e.g. a stylus, a full-size keyboard), but the terminals should still fit into a pocket (opposed to laptop).

Economic reasons include that, for example, the display is one of the most expensive components of a mobile terminal. In order for a mobile phone manufacturer to create different price categories and still make reasonable profit, displays of different quality are needed, starting from low quality and low cost to high quality and high cost.

Currently designers and content publishers have two choices when creating content for mobile terminals and web pages: 1) create one "the lowest common denominator" content or 2) optimize manually content for each of the terminals. Using the lowest common denominator results in Wireless Application Protocol (WAP) type pages, where content is on top of each other. Furthermore, images do not work well and scrolling is essential. Optimizing content manually for different terminals is expensive and laborious, because first the content optimizer must collect information about the terminals and then create the content separately for each of the terminals. Besides, the technology is changing constantly, so the layouts of the content need to be updated all the time.

Vector editing programs enable stretching of content to correspond with the size of a display, after the user has downloaded client software. Sometimes there may not even be software available for that particular operating system. The problem is that the user cannot control how many and what size cells the layouts contain in different size displays. Therefore the content is never optimal for the terminal.

In web editors a layout scales according to the size of the content. This enables that all the content can be shown, if the web editor takes into account capabilities of different mobile web browsers. However, this creates long scrollable content or web pages, which are not optimal for small mobile displays. In mobile terminals the width of content is always forced into the width of the display although a user may have originally determined it to be some other width. This makes the creating of mobile web pages difficult using a web editor, since certain layouts simply do not fit into small mobile terminal displays. Many designers go around this problem by creating WAP type page structures, where content is on the top of each other and there is few or none content side by side, even though the mobile web browser would enable more complex page structures.

Prior art solutions disclose solutions for optimizing content delivered to a receiving terminal. Since nowadays, for example, mobile terminals are able to receive various content via the Internet or a mobile communication network, the variety of the receiving terminals has increased immensely. The prior art content optimization solutions, which are available are either fully automatic or the solution is lacking sophistication or flexibility.

US 2002/0097411 (Roche et al.) discloses a solution in which automatically optimizes an image for a receiving terminal based on the receiving terminal display characteristics. The solution determines from the display characteristics corresponding to the data types of the image, those which are the closest to the extracted display characteristics so that the image data associated with the type of the data corresponding to the determined characteristics are transmitted to the receiving terminal. The solution disclosed in the publication focuses on changing colors and resolution automatically as well as sending the image data gradually to a client device. The publication does not offer a solution in which a designer would be able to influence to content delivered to a user (device).

U.S. Pat. No. 6,741,853 (Jiang et al.) discloses a solution for providing information to devices in a format preferable to a device type. This is achieved by receiving an information request, detecting the device type from which the information request originated, adapting the content for presentation on the device type, and presenting the information to the device. The solution disclosed in the publication is based on fully automation. Furthermore, it does not disclose a solution in which a designer would be able to influence to content delivered to a user (device).

US 2004/0117735 (Breen) discloses a solution for adapting one or more web pages having text, images and/or video content to the characteristics and within the capabilities of the presentation context, delivery context and the content itself. A graphical designer prepares an image or video by creating metadata profiles describing the characteristics and limitations for the images or video. In practice the solution disclosed in the publication works optimally only as a client-server solution and in web pages.

Prior art solutions fail to disclose a solution in which a content editor, e.g. a designer, is able to control the amount of automatic optimization of content sent to a receiving terminal.

SUMMARY OF THE INVENTION

According to one aspect of the invention there is provided a method for optimizing content delivered to a variety of terminal devices. The method comprises creating a plurality of terminal device groups, determining dimensions for each terminal device group, the dimensions comprising the smallest and largest size values determining bounds for the smallest and largest active display areas of terminal devices within a terminal device group, creating a layout for each page of a terminal device group, each layout definition comprising at least one media cell, creating at least one media cell within each layout, determining properties for each media cell, the properties comprising dimensions comprising the smallest and largest size values determining bounds for the size of a media cell within a layout, and optimizing content into a terminal device based on the determined definitions.

According to another aspect of the invention there is provided a server for optimizing content delivered to a variety of terminal devices. The server is configured for performing the following steps: creating a plurality of terminal device groups, determining dimensions for each terminal device group, the dimensions comprising the smallest and largest size values determining bounds for the smallest and largest active display areas of terminal devices within a terminal device group, creating a layout for each page of a terminal device group, each layout definition comprising at least one media cell, creating at least one media cell within each layout, determining properties for each media cell, the properties comprising dimensions comprising the smallest and largest size values determining bounds for the size of a media cell within a layout, and optimizing content into a terminal device based on the determined definitions.

According to another aspect of the invention there is provided a computer program embodied on a computer readable medium for optimizing content delivered to a variety of terminal devices, wherein the computer program controls a data-processing device to perform the steps of: creating a plurality of terminal device groups, determining dimensions for each terminal device group, the dimensions comprising the smallest and largest size values determining bounds for the smallest and largest active display areas of terminal devices within a terminal device group, creating a layout for each page of a terminal device group, each layout definition comprising at least one media cell, creating at least one media cell within each layout, determining properties for each media cell, the properties comprising dimensions comprising the smallest and largest size values determining bounds for the size of a media cell within a layout, and optimizing content into a terminal device based on the determined definitions.

For further embodiments of the invention reference is made to the claims.

The present invention has several advantages over the prior-art solutions. The invention makes it possible to import, optimize and publish content simultaneously to different media environments. A further advantage of the invention is that a designer is able to influence to content delivered to a user device.

Furthermore, the invention provides a flexible, accurate and quick way to create and optimize content into various terminal devices at the same time. The solution is also easily manageable since it is a server-based solution. Therefore, user rights management and database updating is easier than in a client-based solution.

A further advantage of the invention is that content can be input using various browsers (e.g. a personal computer, a digital television, a mobile browser) and at the same time it is possible to display the input content with multiple browsers.

A further advantage of the invention is that a user is able to determine the degree of optimization by determining appropriate values for terminal device groups, layouts and media cells within the layouts.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 2a illustrates the determination of terminal device group dimensions for a page viewed with a mobile terminal according to one embodiment of the invention;

FIG. 4 illustrates content determination within a media cell according to one embodiment of the invention;

FIG. 14 discloses an example of importing content into a media cell according to one embodiment of the invention;

DETAILED DESCRIPTION OF THE PREFERRED EMBODIMENTS

Reference will now be made in detail to the embodiments of the present invention, examples of which are illustrated in the accompanying drawings.

Figure 1:
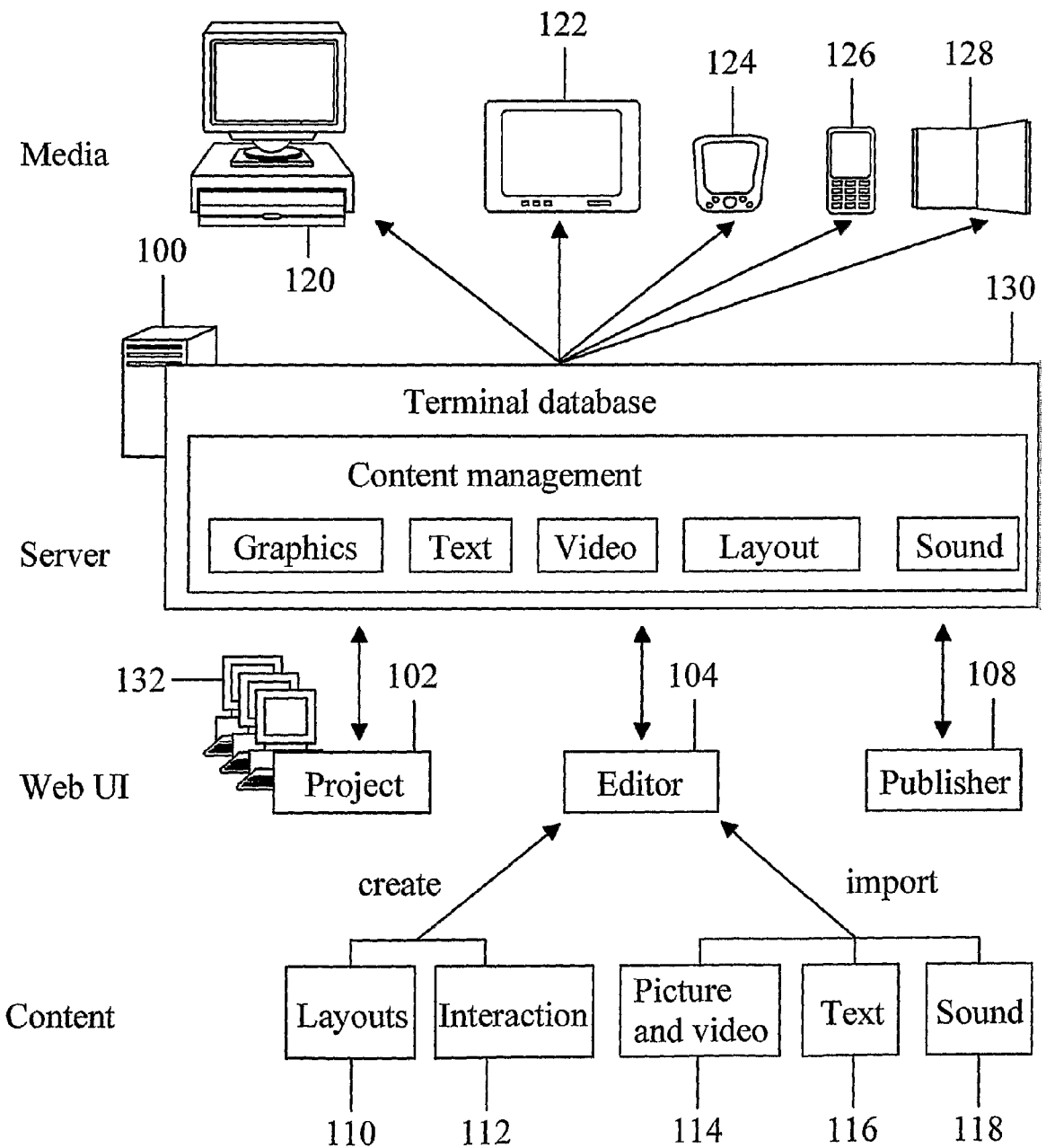
FIG. 1 is block diagram showing the overall structure of a server according to the invention.

FIG. 1 is block diagram showing the overall structure of a server according to the invention. The core of the invention is an application 130 running in a server computer 100. With the application 130 a designer is able to import content and publish it simultaneously in real time to multiple media environments. Multiple media environments comprise e.g. a personal computer (PC) 120, a digital television 122, a personal digital assistant (PDA) 124, a mobile phone 126 and a print 128.

The server computer 100 comprises two main parts: (1) a terminal database, and (2) content management. Active display areas of various terminal devices and terminal identifiers have been stored in the terminal database. For example, there exists various display sizes in mobile phones currently on the market. In one embodiment of the invention, each mobile phone model has a separate entry in the terminal database. It is evident that the terminal database may comprise also additional information not disclosed here.

A user is in connection with the server computer e.g. via the Internet (Web user interface). The user is provided with three main functions: (1) project 102, (2) editor 104, and (3) publisher 108. In the projects function the user determines main characteristics for a project. In the editor, the user determines, for example, layout characteristics 110 for a page and the number and characteristics of media cells in each page. Furthermore, the user determines content 114, 116, 118 for each media cell. Finally, in the publisher function created pages may be published in a desired way. The main functions will be described in more detail below.

When the server 100 receiver a page request from a terminal device, it determines the optimal content for the terminal device and provides the terminal device with the optimized content.

It should be understood that the solution disclosed in the invention does no necessarily require any coding, e.g. HTML coding, from a user. However, the solution provides an interaction function 112 by which interaction, e.g. code, may be included in a page content.

In the embodiment of FIG. 1 it was disclosed that the server comprised also a terminal database. In another embodiment of the invention, the server does not comprise a terminal database, but is able to deduce an active area of a requesting terminal device without a terminal database. In this embodiment, one possibility is to divide mobile terminals into, for example, three categories based on an active display are: small, medium and large. If the terminal database is not available it may not be possible to optimize content to the mobile terminal as accurate as in the case where the terminal database exists.

If the terminal database is not available, and a user requesting content wishes to see content directed to mobile devices correctly, he/she may have to download first a plug-in, which is able to combine the display size of a terminal in question and a layout, in other words, retrieves a correct layout from a server.

FIG. 2a illustrates the determination of terminal device group dimensions. In this example there are three terminal device groups selected: mobile small, mobile medium and mobile large. Each terminal group is assigned a "from and to" value for the width and height. The values are disclosed in pixels and they represent an active display area of a terminal device. The meaning of these values will be disclosed in subsequent examples. In other embodiments, also other quantities instead of pixels may be used, e.g. millimeters etc. In one embodiment of the invention, in the dimension of a terminal device group the smallest size value equals to the largest size value.

In one embodiment of the invention it is assumed that the software has access to a terminal database. Based on the determined active display area values, terminal devices (e.g. mobile terminals) find their way automatically into a right group. The terminal database comprises e.g. information on the active display area sizes of the mobile terminals. When the active area size of a mobile terminal is compared with the 'smallest' and 'biggest' values set by the user, the mobile terminal is automatically put into an appropriate mobile terminal group. The user is therefore able to view, which mobile terminals are within each terminal group.

When creating a project, the user may also be able to create a user-defined group that comprises one or more mobile terminals. For example, some mobile terminals (e.g. a Nokia Communicator) may have a display size that is not so typical for mobile terminals. Therefore, it may be appropriate to determine a separate layout (group) for such mobile terminals.

Figure 2B:
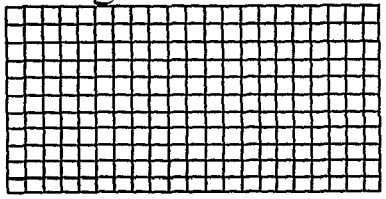
FIG. 2b illustrates the determination of page properties for a page viewed with a mobile terminal according to one embodiment of the invention.

FIG. 2b illustrates the determination of page properties for a page viewed with a mobile terminal according to the invention. Each page has a name and a layout size. The layout size is expressed e.g. in pixels. In this embodiment, layout sizes may be different for different mobile terminals within a group depending on the device. For example, the smallest width in the group may be 65 pixels and the smallest height 95 pixels. Correspondingly, the biggest width in the group may be 160 pixels and the biggest height 180 pixels. A layout stretch percent refers to a value determining how much the layout is able to stretch over the active display area. By using the stretch percent the creator of the page is able to directly determine how the page is going to be displayed on a terminal display (how much the page has to be scrolled on the terminal display). FIG. 2b also discloses the amount of mobile terminals in this group, and also the smallest and largest phone (display area size).

If the layout values are exactly the same as terminal group dimensions, the layout it exactly the same size as the active display of a terminal device. If the layout stretch value is set to zero, the size of the layout and the size of the active display area remain always the same. If the layout stretch value is not zero, this may result in scrolling the content, but the amount of scrolling depends on the amount of the content.

By a grid size value the user is able to determine how many columns and rows the page consists of.

If the width of a layout is larger than the width of an active display area of a mobile terminal device, a mobile browser in the mobile terminal device may force the width of the layout to comply with the width of the active display area.

Figure 3:
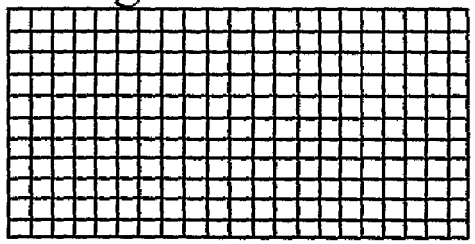
FIG. 3 illustrates the determination of media cell properties according to one embodiment of the invention.

FIG. 3 illustrates the determination of media cell properties according to one embodiment of the invention. The term "media cell" refers to a cell into which user-determined content may be addressed. At this point the user does not yet determine any content into the media cell. A proper name may be given to the cell. The most important values for each media cell are the dimensions. The user determines the smallest and biggest values for the width and the height. Based on there values the media cell is able to stretch between different terminal devices within a group. Using grid spans it is possible to combine one or more media cells. Furthermore, it is possible to determine margins for the media cell by setting appropriate values in the margin fields. It is also possible to determine further properties (e.g. background color, background picture etc) for the media cell.

The use of the 'smallest' and 'biggest' values (i.e. from and to values) enables the size of a media call to act differently with different terminals within a specific group. For example, by using 'smallest' and 'biggest' values within a terminal group (e.g. large mobile phones) different mobile terminal may display e.g. a different amount of text in a specific media cell.

FIG. 4 illustrates content determination within a media cell according to the invention. Horizontal and vertical alignments determine how the content is to be aligned within the cell. The user chooses a content type for the media cell. In this example, the content type is 'picture'. Other possible content types are, for example, text, video, audio, flash object, form element, navigation etc. The user may insert a picture in the media cell by clicking the 'choose' button.

By inserting a value in the stretch percent field, it is possible to control how much an image is allowed to scale automatically within the media cell. The value of the field may be any value between zero and hundred. If the value is set to zero, the software gives a suggestion notification each time the picture is not exactly the same pixel size as the media cell or if text does not fit into the media cell. If the value is set to hundred, the software never gives a suggestion notification because the image will be automatically scaled to fit in the media cell.

For example, in mobile browsers it may not be possible to (visually) crop an image on a display of a mobile terminal device while importing it into a media cell. Therefore, when creating a project using a mobile browser it may be assumed that the image stretch percent is quite high. In other words, inputting images via a mobile browser would not be possible in practice if the images were not always the same size as the media cells.

In another embodiment of the invention, the stretch percent functionality is a bit different. By inserting a value in the stretch percent field, it is possible to control how much the media cell is allowed to scale automatically when importing picture or text content into the media cell in content function before picture or text suggestions are presented. The value of the field may be any value between zero and hundred. If the value is set to zero, the software gives a suggestion notification each time the picture is not exactly the same pixel size as the media cell or if text does not fit into the media cell. If the value is set to hundred, the software never gives a suggestion notification because the media cell will automatically scale to fit the picture or text.

If the same media cell is located in multiple targets (terminal groups), it is possible to activate changes also in these groups by selecting one or more check boxes.

Figure 5:
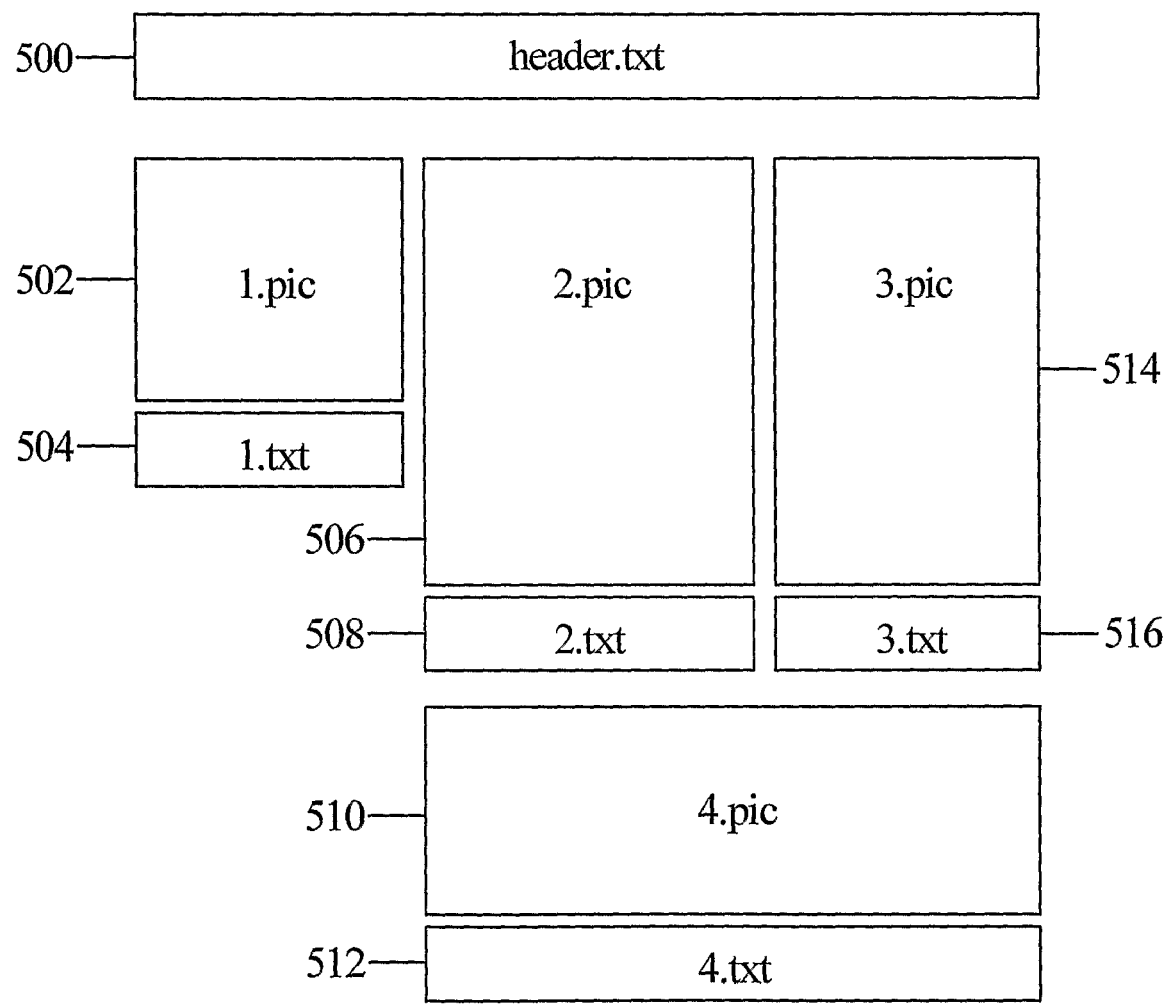
FIG. 5 discloses a simplified example of a page layout and the number of media cells on a computer display according to one embodiment of the invention.

FIG. 5 discloses a simplified example of a page layout and the number of media cells on a computer display. In other words, when the device requesting a particular content from a web server is a computer, the page disclosed in FIG. 5 is sent to the computer. The layout disclosed in FIG. 5 comprises nine media cells: four media cells 502, 506, 510, 514 comprising an image and five media cells comprising text 500, 504, 508, 512, 516. Each media cell has dimensions that are optimal for viewing the page on a computer display (e.g. 800×600 pixels).

Figure 6:
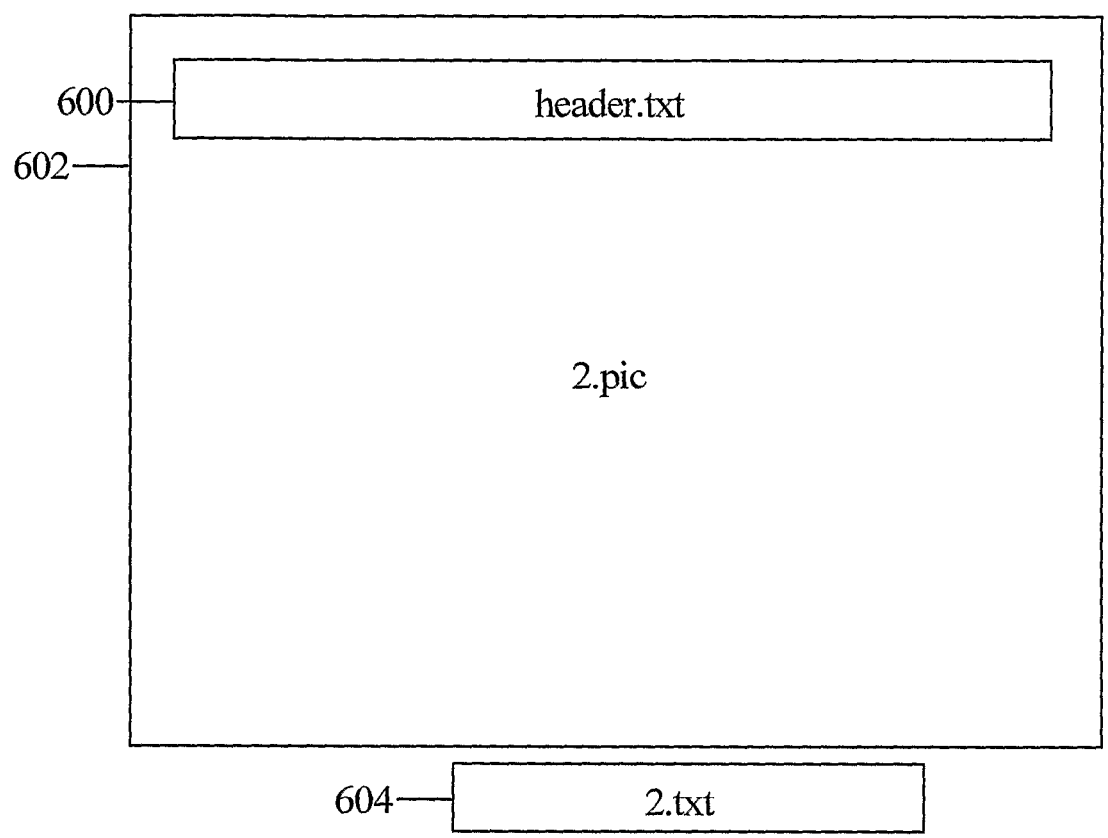
FIG. 6 discloses a simplified example of a page layout and the number of media cells on a television display according to one embodiment of the invention.

The functionality of the invention can be better understood from FIGS. 6-9 when comparing them with FIG. 5. In FIG. 6, the device requesting a particular content from a web server is a (digital) television. In this case, the designer of the page has created the layout disclosed in FIG. 6 for (digital) televisions. The layout comprises only one media cell 602 comprising an image and two media cells 600, 604 comprising text. It is known that typically the television layout is wider than higher. Therefore, different pixel sizes have been defined for the media cell 602 than for the media cell 506 in FIG. 5. In other words, in the television the image in the media cell 602 is larger than in the media cell 506. This means that also the picture area of a particular picture itself may be different for different receiving devices.

The content in the media cells 600, 604 may the exactly the same as in FIG. 5. In another embodiment, they may also differ. As can be seen by comparing FIGS. 5 and 6, the media cell 604 is wider than media cell 508. Therefore, the media cell 604 may comprise more text than the media cell 508 although they have been named identically.

Figure 7:
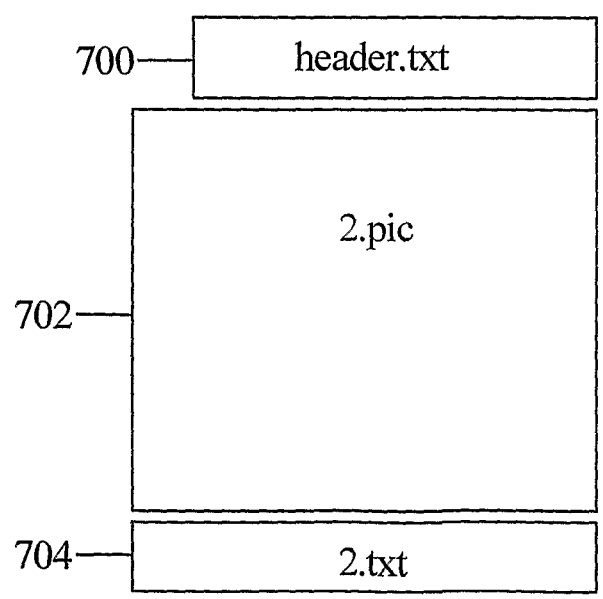
FIG. 7 discloses a simplified example of a page layout and the number of media cells on a personal digital assistant display according to one embodiment of the invention.

FIG. 7 discloses a simplified example of a page layout and the number of media cells on a personal digital assistant display. The number of media cells is the same as in the previous case. The media cell 702 is however much smaller than in FIG. 6. The picture area in the media cell 702 is smaller than in the media cell 202 of FIG. 6.

Figure 8:
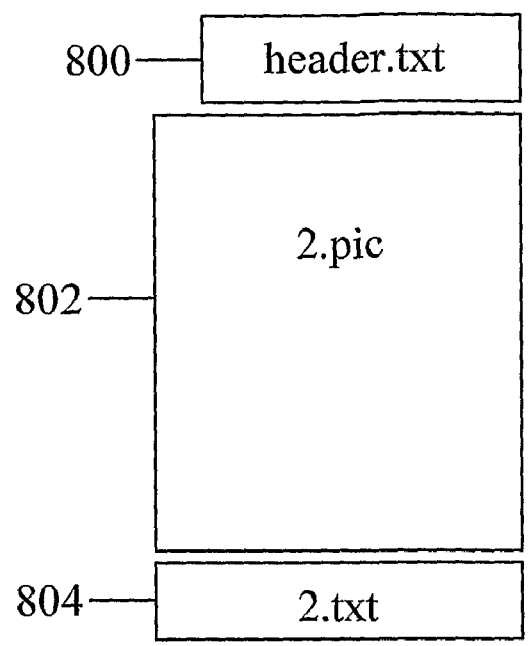
FIG. 8 discloses a simplified example of a page layout and the number of media cells on a mobile phone display according to one embodiment of the invention.

FIG. 8 discloses a simplified example of a page layout and the number of media cells on a mobile phone display. By comparing FIGS. 7 and 8 it can be seen that they almost the same. The difference between them is that the display of the mobile phone has a smaller active display area than the display of the personal digital assistant. Therefore, also the media dimensions of the media cells 800, 802, 804 are smaller in FIG. 8.

Figure 9:
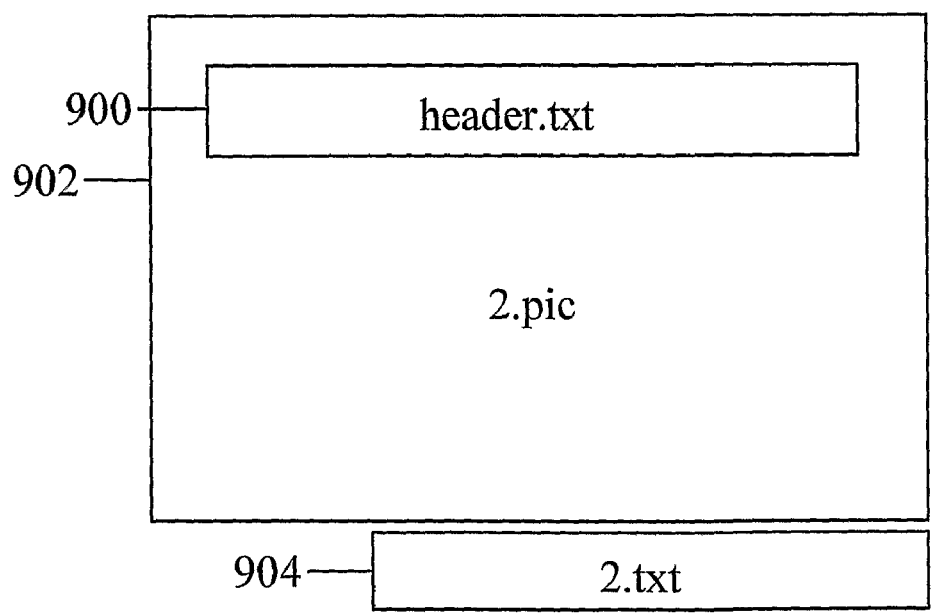
FIG. 9 discloses a simplified example of a page layout and the number of media cells on a printed post card according to one embodiment of the invention.

FIG. 9 discloses a simplified example of a page layout and the number of media cells on a printed post card. By comparing FIGS. 6 and 9 it can be seen that the sizes of the media cells 900, 902, 904 have been optimized for a printed post card. In a print, the layout is fixed. In other words, the value of layout stretch percent is zero.

As a summary regarding FIGS. 5-9 the user is able to create exact layouts and optimize the amount of content to different media environments simultaneously. With the solution disclosed in the invention, the user can create, for example, three different layouts for mobile phones: large, medium and small. The user can also fine tune the media cells by controlling the dimensions of the smallest and biggest media cells in the group. The user can, for example, define a media cell so that there is room for two rows of text in the smallest media cell and four rows in the biggest media cell. The user can also control the size and "stretching" of the layout and the "stretching" of a picture in a media cell.

Figure 11:
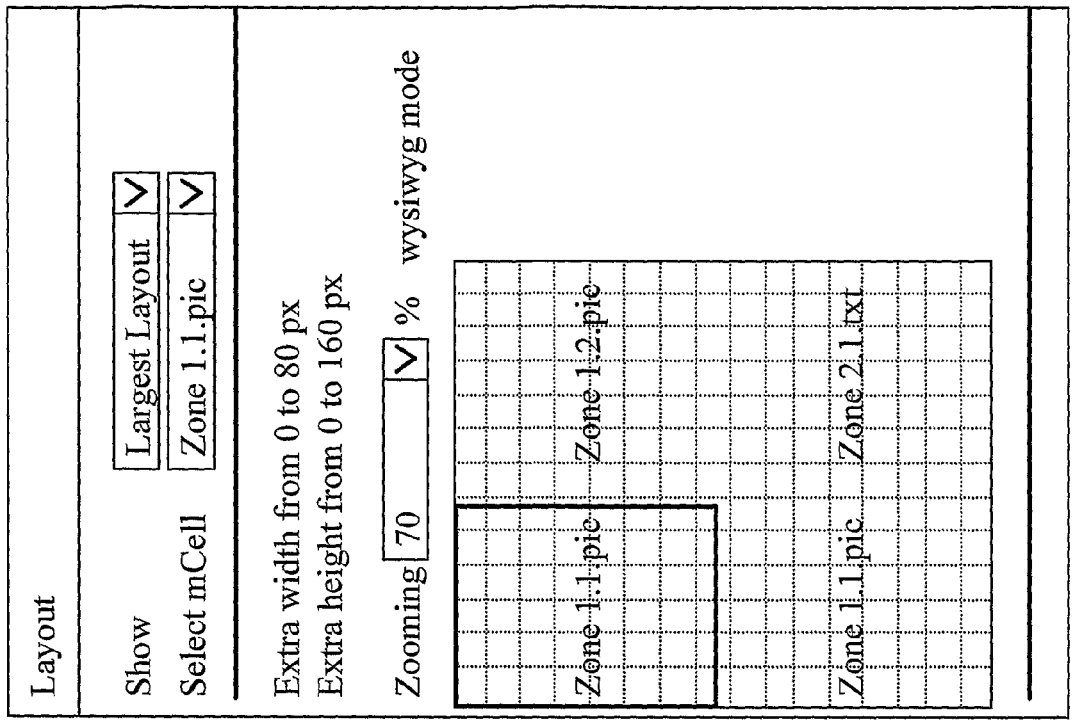
FIGS. 10-13 disclose examples of possible layouts in different terminal groups according to one embodiment of the invention.
Figure 10:
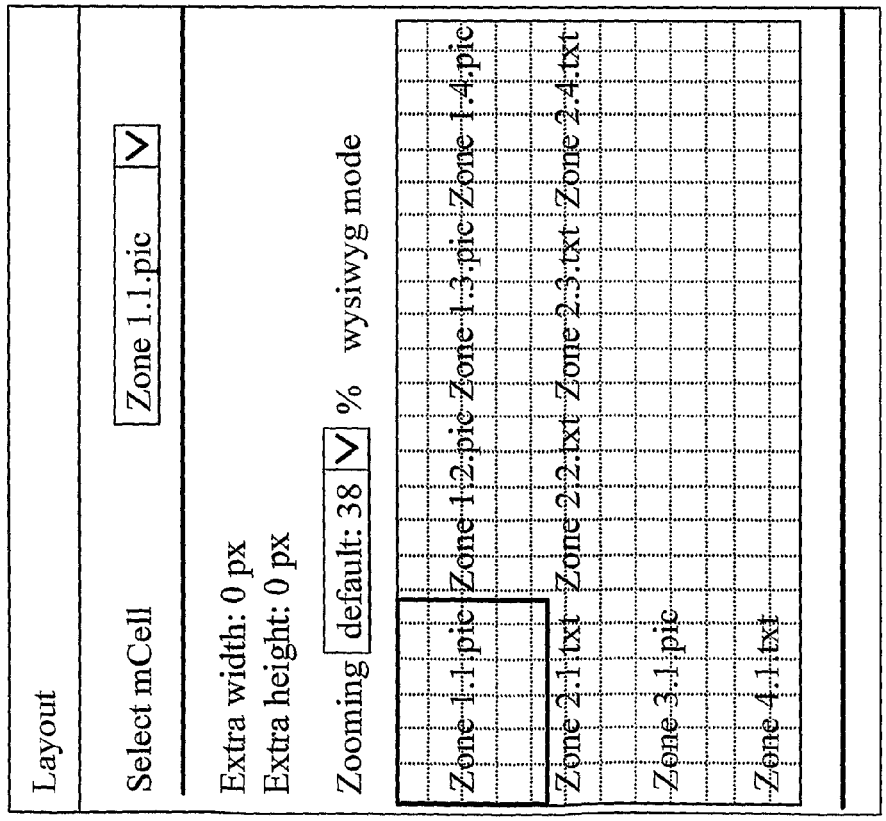
Figure 12:
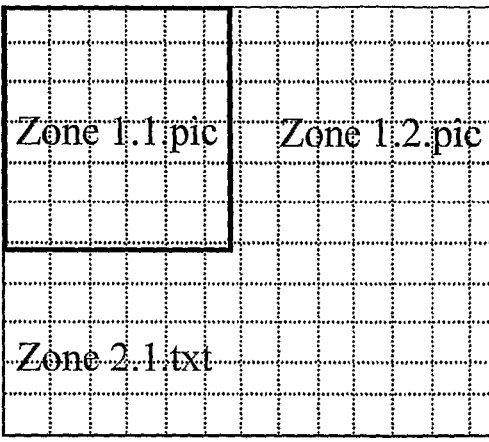
Figure 13:
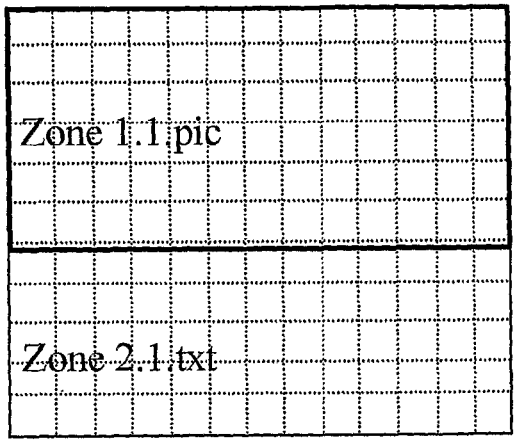

FIGS. 10-13 disclose further examples of possible layouts in different terminal groups. FIG. 10 represents a group for a computer. FIG. 11 represents a group for mobile terminals having a large display size. FIG. 12 represents a group for mobile terminals having a medium display size. FIG. 13 represents a group for mobile terminals having a small display size. As can be seen from the figures, media cells have been named uniformly. For example, media cells Zone 1.1.pic and Zone 2.1.txt exist in all layouts of FIGS. 10-13. When uniform naming is used, it is possible to activate changes in multiple groups at the same time, as was disclosed in the description of FIG. 4. In FIGS. 11-13 the software gives suggestions about contents in various media cells. Suggestions may refer e.g. to images or texts. For example, in FIG. 13 an image is too small for media cell Zone 1.1.pic. It means that the image could be larger than at the moment. Similarly, in FIG. 12 an image is too large for media cell Zone 1.1.pic. Suggestions may also tell if text does not completely fit into media cell. For example, in FIG. 13, text may be too long for Zone 2.1.1.txt. Let's assume that Zone 2.1.txt in FIG. 10 contains 300 characters of text. As the same zone is similarly named also in FIG. 13 (mobile terminals having a small display size) 300 characters may not fit into the media cell in the mobile terminal. In such a situation the software may give a suggestion that the whole text content (300 characters) does not fit into the Zone 2.1.txt of the mobile terminal of FIG. 13. The software may use e.g. color codes (e.g. highlights the part that does not fit into the media cell using a specific color) to show which part of the 300 characters fits into the Zone 2.1.txt.

FIGS. 10-13 disclose also the lowest common nominator way of thinking. In FIG. 13, the active display area of a mobile terminal device allows only a small image and some text. In FIG. 12, the active display area of a mobile terminal device is larger, and it allows two images and some text. In FIG. 11, the active display area of a mobile terminal device is the largest, and it allows three images and some text. It is noteworthy that the same image (in the Zone 1.1.pic) is present in all layouts of FIGS. 10-13.

FIG. 14 discloses an example of importing content into a media cell according to one embodiment of the invention. On the left has been arranged a group of importable images. It is also possible to import an optional image from a local storage by selecting the upload option. In the importing process a user is able to select a desired cropping box size by inserting appropriate values into the width and height boxes. In FIG. 14, the user is shown the smallest and largest zone (media cell) sizes. Based on these sizes the user may select an appropriate cropping box size. In one embodiment of FIG. 14, additional cropping boxes may be shown to the user. The additional cropping boxes show image areas that will fit into the smallest media cell (zone) and the largest media cell (zone).

The selected cropping values may be selected to correspond e.g. with dimensions of a media cell. By checking one or more check boxes on the left the content to be imported in imported to these groups at the same time. It is also possible to scale an image before cropping it (scale box). By selecting a smaller scale value the user may determine the accuracy of the area, which is to be cropped.

In the invention layouts may be determined for a plurality of various groups. The layouts may comprise at least one of the following: personal computer picture, personal computer html, television picture, television html, personal digital assistant device picture, personal digital assistant device html, smart phone picture, smart phone html, mobile phone picture, mobile phone html, wap, mms large, mms medium, mms small, sms, text only and a print etc. It is evident that there may also other terminal groups, e.g. hand held gaming devices, portable music/video players etc that are not mentioned above.

Using the solution disclosed in the invention a user is able to determine the degree of accuracy and automation for creating content into media cells. The solution enables the user to create a project in which media cells are very accurately determined and they are inflexible. At the same time, user is able to create a project in which the properties of media cells are determined loosely thus enabling a lower degree of optimization for different media environments.

In an inflexible layout of a project, there is a larger amount of manual content optimization (including e.g. cropping, scaling, modifying the amounts of text etc.). On the other hand, in a flexible layout of a project the user only chooses content into the layout (media cells) without further manual optimization. For example, layouts for mobile terminals are preferably flexible since manual optimization is not reasonable.

The following lists a number of possible characteristics of the solution disclosed in the invention:
  Terminal groups are user-determinable. The user may determine the number of groups and their dimension ranges.
  The user is able to determine layout sizes and stretch percents.
  The user is able to manage an eccentric growth of images (from and to values) in media cells and also the scale factor of the images.
  The user is able to manage an eccentric growth of media cells within a terminal device group when the smallest and largest values have been determined for a layout.
  The user is able to input content into multiple media environments simultaneously and to publish the created content in real time.

Figure 15:
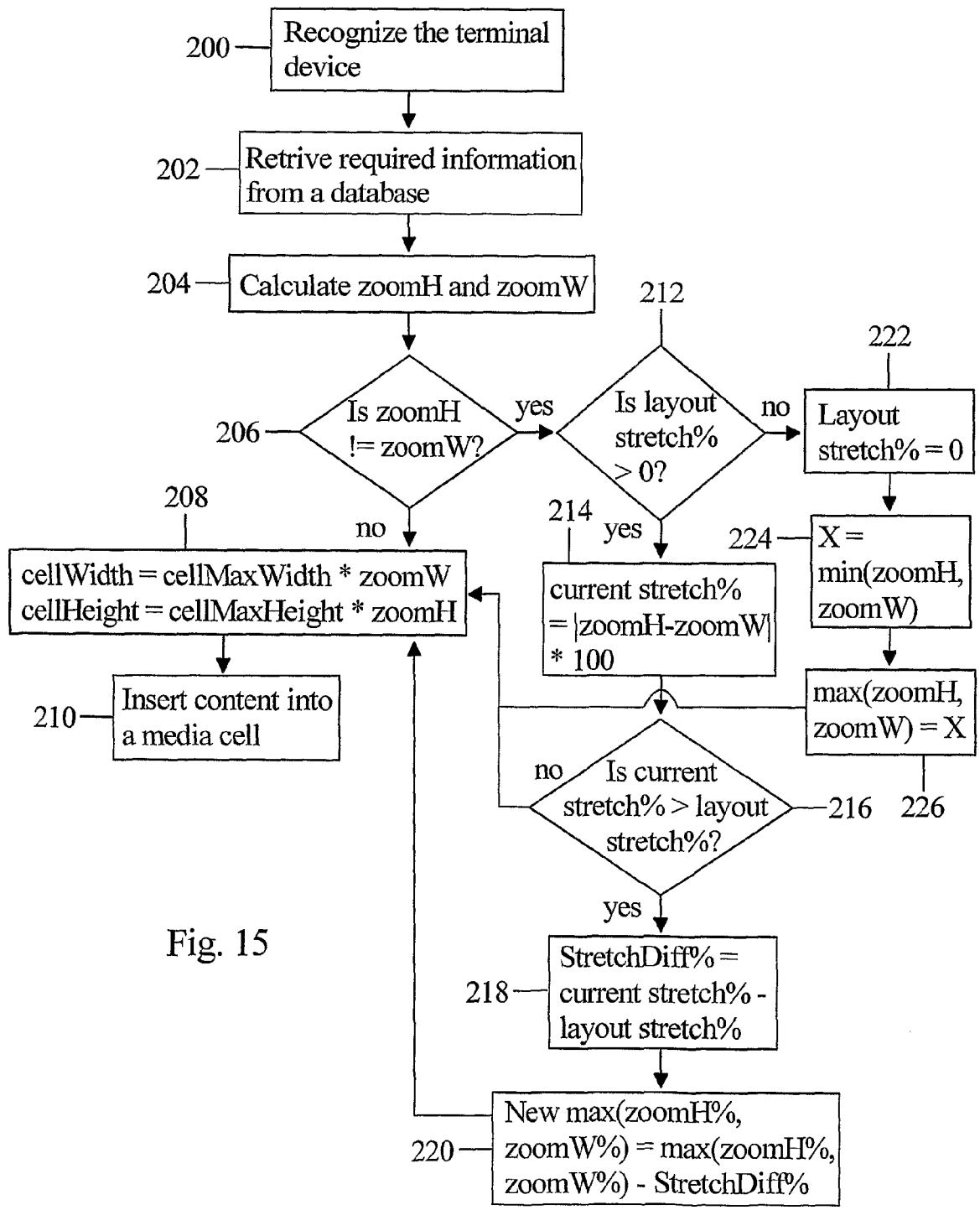
FIG. 15 discloses a flow chart illustrating the determination of an optimized size of layout into a terminal device according to one embodiment of the invention.

FIG. 15 discloses a flow chart illustrating the determination of an optimized size of layout into a terminal device according to one embodiment of the invention.

A server 100 disclosed in FIG. 100 comprises a database into which certain definitions have been stored. In this example the definitions comprise:
  Dimensions affecting to grouping of terminal devices with relation to layouts
  Active display areas of terminal devices
  Layout dimensions (width, height; from—to)
  Media cell dimensions (width, height; from—to)
  Image dimensions (width, height; calculated e.g. based on cropping information.

At step 200 an application in the server recognizes the terminal device requesting content from the server. Based on the recognition the application retrieves from the database information relating to the terminal device, step 202. Based on the information relating to the terminal device correct terminal device group information is also retrieved from the database. Since a terminal device group may comprise several separate terminal devices (active display area sizes), the application retrieves a correct layout and content for the terminal device.

Next, the application calculates two ratios based on the width and height of active display area and layout. In the following the ratios will be denoted as 'zoomH' (height) and 'zoomW' (width). ZoomH is calculated based on the following formula: height of the active display area divided by the largest allowable height of the layout. ZoomW is calculated based on the following formula: width of the active display area divided by the largest allowable width of the layout. For example, if the height of the active display area is 170 and the width 180, and the largest allowable layout height is 210 and the width 250, then zoomH=170/210=0.81 and zoomW=180/250=0.72.

At step 206 the application determines whether there has been expansion in the layout. If zoomH equals with zoomW, there has not been expansion in the layout and the processing continues to step 208. At step 208 final dimensions of the media cell in the layout are determined by the following formulas: (1) cellWidth=cellMaxWidth*zoomW and (2) cellHeight=cellMaxHeight*zoomH.

If zoomH is not equal with zoomW, the processing continues to step 212. At step 212 it is determined whether a layout stretch % is greater than zero. The layout stretch % has been determined by a page designer in an editing phase of content into different media environments. In this example, the designer has determined a value of 5% for the layout stretch %.

If the layout stretch % is greater than 0 (as it is in this example), the processing continues to step 214. At step 214 a new value (current stretch %) is determined by the following formula: current stretch %=|zoomH−zoomW|*100. In this example the value of current stretch % would be |0.81−0.72|*100=9%. If the current stretch % is smaller than the layout stretch %, the processing continues to step 208. At step 208 final dimensions of the media cell in the layout are determined by the following formulas: (1) cellWidth=cellMaxWidth*zoomW and (2) cellHeight=cellMaxHeight*zoomH.

If the current stretch % is greater than the layout stretch % (as it is in this example), the processing continues to step 218. At step 218 a value for StretchDiff % is determined by the following formula: StretchDiff %=current stretch %−layout stretch %. In this example the value of StretchDiff % would be 4% (9%−5%). The processing continues at step 220 in which a value for the greater one of zoomH % and zoomW % is determined by the following formula: New max(zoomH %, zoomW %)=max(zoomH %, zoomW %)−StretchDiff %. In this example the value of New max(zoomH %, zoomW %) would be 77% (81%−4%). The processing continues to step 208 in which final dimensions of the media cell in the layout are determined by the following formulas: (1) cellWidth=cellMaxWidth*zoomW and (2)

cellHeight=cellMaxHeight*zoomH. In this example, cellWidth=120*0.72=86 (pixels) and cellHeight=120*0.77=92 (pixels).

If the layout stretch %, however, is 0% (step 222), the processing continues to step 224. At step 224 it is determined which of the terms (zoomH, zoomW) is smaller. The smaller value is denoted by 'X'. In this example the smaller value would be zoomW (0.72). At step 226 a new value is determined for the larger one of the terms (zoomH, zoomW). The new value is the previously determined smaller value (0.72). In other words, now the value of zoomW would be 0.72. Next, at step 208, final dimensions of the media cell in the layout are determined by the following formulas: (1) cellWidth=cellMaxWidth*zoomW and (2) cellHeight=cellMaxHeight*zoomH.

Finally, at step 210, content is inserted into a media cell.

Figure 16:
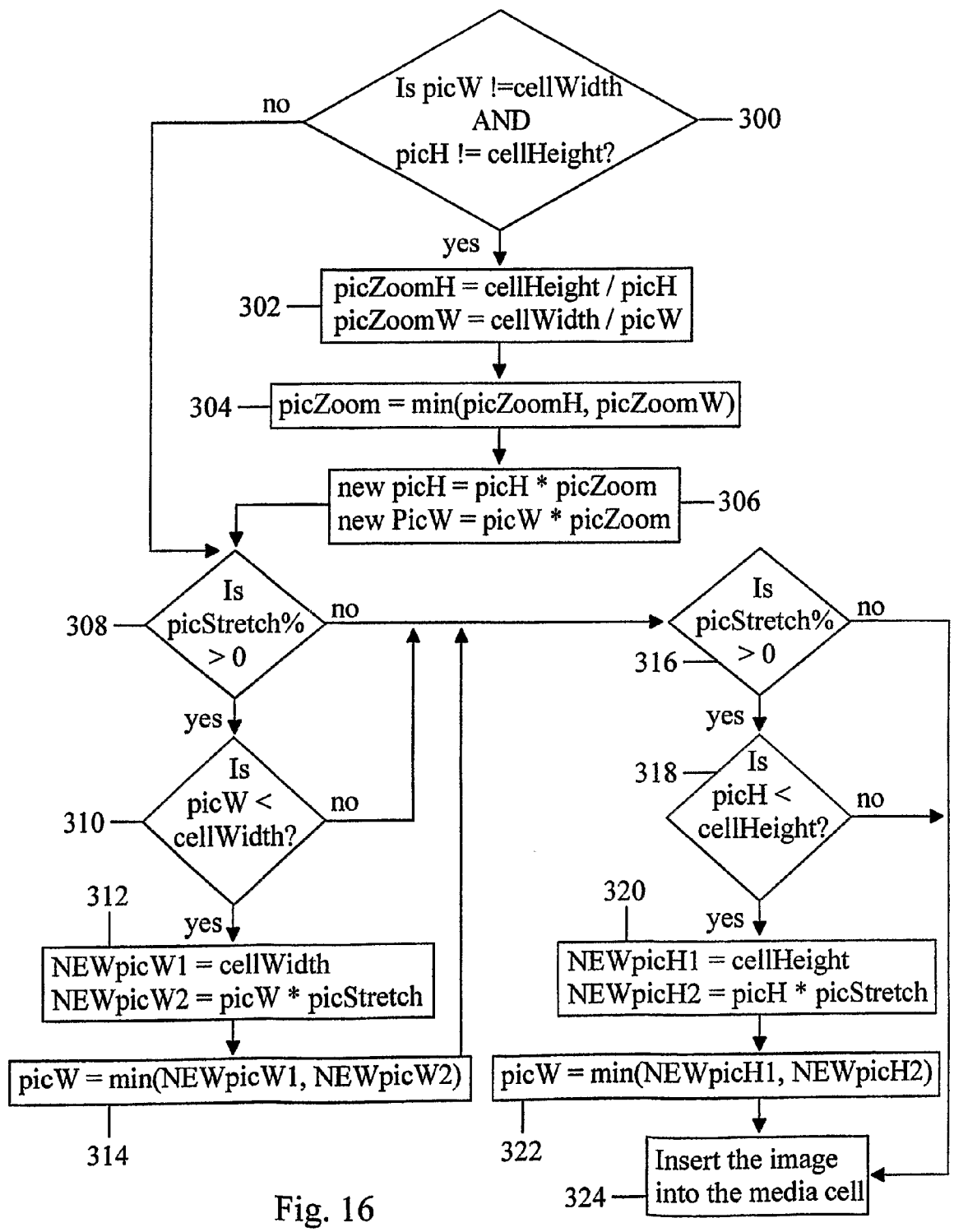
FIG. 16 discloses a flow chart illustrating image optimization into a media cell according to one embodiment of the invention.

FIG. 16 discloses a flow chart illustrating image optimization into a media cell according to one embodiment of the invention.

Prior to step 300, a chosen image has already been cropped and resized based on theoretical dimensions (the smallest and biggest values in the width and height) of a media cell. However, typically the image size does not equal with the size of the media cell in this stage. The dimensions of the image are denoted as 'picW' (width) and 'picH' (height).

At step 300 if both the heights of the image and media cell and the widths of the image and media cell differ from each other, the processing continues to step 302. Otherwise, the processing continues to step 308. At step 302 it is determined two reduction factors (picZoomH and picZoomW) are determined by the following formulas: (1) picZoomH=cellHeight/picH and (2) picZoomW=cellWidth/picW. At step 302 a smaller one of these values is chosen. In this example picZoomH=92/100=0.92 and picZoomW=86/100=0.86. The value of picZoomW is smaller, and therefore, the value of picZoom is 0.86 (picZoom %=86%).

At step 306 new values are determined for picH and picW by the following formulas: (1) new picH=picH*picZoom and (2) new picW=picW*picZoom. In this example, the new values would be picH=100*0.86=86 (pixels) and picW=100*0.86=86 (pixels). The result is that the image fulfills the media cell entirely by its width but there remains space in the other direction (height) at this stage.

The processing continues at step 308 in which it is determined whether it is necessary to stretch the image in terms of width. If the value of picStretch % is larger than zero, the processing continues to step 310. The value of picStretch % has been determined by a page designer in an editing phase of content into different media environments. In this example, the value of picStretch % is 4%. At step 310 it is determined whether the width of the image is smaller than the width of the media cell. If it is smaller the processing continues to step 312. However, if either one of steps 308 and 310 results in a 'no' answer, the processing continues directly to step 316. In this example picW is 86 and cellWidth is also, and therefore, the value of picW remains unchanged. In this example, the processing would continue to step 316.

If both of steps 308 and 310 resulted in 'yes' answer, the processing continues at step 312. At step 314 the width of the image is stretched. A new value for picW (NEWpicW) is determined using two different formulas separately: (1) NEWpicW1=cellWidth and (2) NEWpicW2=picW*picStretch (wherein picStretch=1+picStretch %/100). At step 314 the smaller one of these values is chosen. After this, the processing continues to step 316.

At step 316 it is determined whether it is necessary to stretch the image in terms of height. If the value of picStretch % is larger than zero, the processing continues to step 318. The value of picStretch % has been determined by a page designer in an editing phase of content into different media environments. In this example, the value of picStretch % is 4%. At step 318 it is determined whether the height of the image is smaller than the height of the media cell. If it is smaller the processing continues to step 320. However, if either one of steps 316 and 318 results in a 'no' answer, the processing continues directly to step 324. In this example picW is 86 and cellWidth is 92, and therefore, the processing would continue to step 320.

If both of steps 316 and 318 resulted in 'yes' answer (as was the case in this example), the processing continues at step 320. At step 320 the height of the image is stretched. A new value for picH (NEWpicH) is determined using two different formulas separately: (1) NEWpicH1=cellWidth and (2) NEWpicH2=picW*picStretch (wherein picStretch=1+picStretch %/100). At step 322 the smaller one of these values is chosen. In this example, NEWpicH1 would be 92 and NWEpicH2 86*(1+4/100)=89, and therefore, the smaller value (89) would be chosen. As a result, a new value of picH is now 89 pixels. After this, the processing continues to step 324.

At step 324 the image is inserted into the media cell. In this example the size of the image would be 86×89 pixels in a media cell having dimensions 86×92 pixels. Therefore, a suggestion would be presented in a suggestions list that the inserted image is smaller than the media cell.

It is also possible to optimize the amount of text fitting into media cells. First, an estimation is calculated what is the maximum amount of characters. The estimation is based on a font size in a terminal device in proportion to a usable area (that is, cellWidth and cellHeight). The text will be clipped if the text will not fit into a media cell based on the estimation. One possibility is to cut a required amount of characters off from the end portion of the text.

In one embodiment of the invention, there is a predetermined sequence in determining the right layout size to a receiving terminal, preferably for a mobile terminal. The first option is to determine the right layout size from a terminal database (FIG. 1, 130). The right layout size refers e.g. to an exact browser active area. Headers, footers, side scroll bars etc. are omitted. If the layout size determination is not possible to be made based on information comprised in the terminal database, the next option is to use phone manufacturers' database, which determines an active area of a display.

If there is no data available about the terminal display size in the terminal database or the phone manufacturers' database, a 'mobile text' layout will be sent to the terminal. However, at the same time the user is presented with "txt, S, M, L" options on the top of the display. By selecting different letters (txt (text), S (small), M (medium), L (large) the user can select the layout size that best fits his terminals display size. The final selection is made by selecting an "OK" function. The information is collected to the terminal database and when there is a certain amount of same selections made with the same size this will become the default size for the particular terminal. The terminals are also followed in order to add exact active area sizes to terminals which are used most. This makes updating of the terminal database considerably more time and resource efficient.

As disclosed earlier it possible to determine particular groups, namely, picture and html groups. If a terminal browser does not fulfill html browser requirements (that is, personal computer browser standards), the terminal may be directed to a "picture group". The aforementioned requirements include for example the amount of table levels. Some mobile and MHP digital TV browsers support only one table level. This makes it impossible in practice to show in these terminals web pages which support (pc web browser) the html standard. The technological quality/level of different terminal browsers is collected e.g. to a database 130.

The 'picture group' means that part of the page grid's (that is, media cell's) rows are trans-formed into a picture format. The rows that are defined to be outside the picture area may include basic html elements, e.g. links. The designer of the page decides which rows are shown as "picture" and which rows are shown as e.g. html links.

The process takes also into account which groups the designer has activated. If the designer has activated only a 'picture group', also html enabled browser terminals are directed to the picture group.

Whenever the terminal is "left outside" a terminal group, a text layout is sent to that particular terminal. If the text group is not activated or of it is empty a default text may be sent to the terminal: "Powered by LumiTools".

Figure 17:
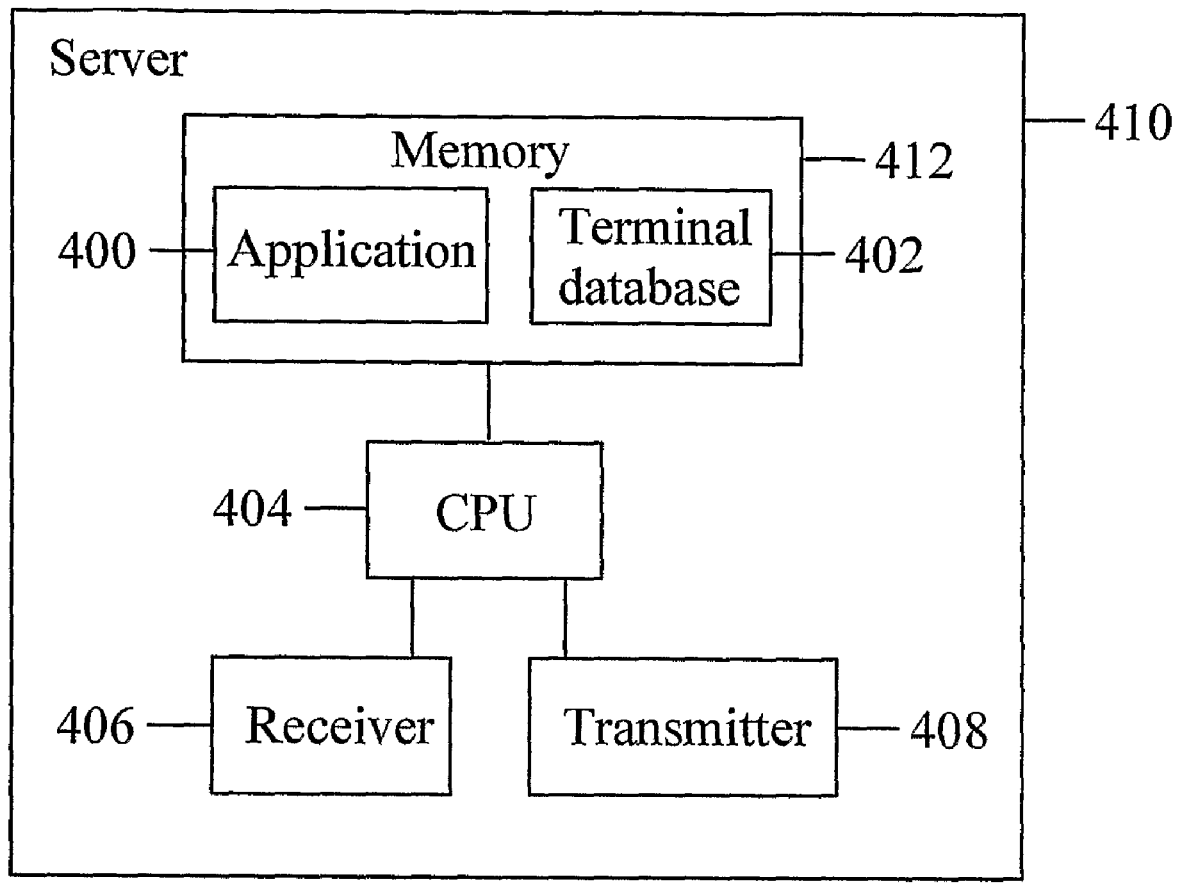
FIG. 17 discloses a simplified server structure according to one embodiment of the invention.

FIG. 17 discloses a simplified server structure according to one embodiment of the invention. The server 410 disclosed in FIG. 1 comprises a central processing unit 410 controlling the functions of the server 410. The CPU 404 is connected with a memory 412. In this example, the memory 412 comprises an application 400 and a terminal database 402. The application 400 comprises a computer program (or a portion thereof), which when executed on the CPU 404 performs at least some of the steps of the invention. The terminal database comprises 402 comprises e.g. information on the active display area sizes of mobile terminals. In another embodiment, the application 400 and the terminal database 402 may reside in separate memories. Yet in another embodiment of the invention, the server 410 does not comprise a terminal database at all. The memory 412 may include e.g. a random access memory (RAM), a read-only memory (ROM) etc. The memory 412 may also include other applications or software components that are not described in more detail. The CPU 404 may also include memory or a memory may be associated therewith which may include the computer program (or portion thereof), which when executed on the CPU 404 performs at least some of the steps of invention.

A receiver 406 connected to the CPU 404 refers to at least one of software and hardware interface via which a page request is received from a terminal device, e.g. a mobile terminal. A transmitter 408 connected to the CPU 404 refers to at least one of software and hardware interface via which a requested optimized page is received to the terminal device.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method for optimizing content delivered to a variety of terminal devices, the method comprising the steps of;
   prior to providing content to a terminal device,
   creating a plurality of terminal device groups;
   determining dimensions for each of the terminal device groups, each of the terminal device groups having a terminal device group specific active display area limit;
   assigning terminal devices to the terminal device groups based on active display areas of the terminal devices;
   creating, for each of said terminal device groups, a respective different terminal device group specific layout for each page;
   creating at least one media cell within each said terminal device group specific layout; and
   determining properties for each said media cell, the properties determining sire limits for the media cell and how the media cell is allowed to adapt within the respective said terminal device group specific layout; and then
   providing content into each said media cell;
   controlling visual representation of the content in the media cell with the respective properties of the media cell; and
   displaying the content at the terminal device as controlled in the controlling step.

2. The method according to claim 1, wherein the properties of the media cell further comprises at least one of a name, a content type, content, an image stretch value, grid spans, and margins.

3. The method according to claim 2, wherein the image stretch value represents how much an image is allowed to stretch within the media cell.

4. The method according to claim 1, further comprising determining dimensions for each said terminal device group specific layout, the dimensions comprising smallest and largest size values.

5. The method according to claim 4, wherein the determined dimensions provide that a smallest size value equals a largest size value.

6. The method according to claim 1, further comprising determining a layout stretch value for each said terminal device group specific layout, the layout stretch value representing how much the layout is allowed to stretch outside the active display area of the terminal device.

7. The method according to claim 1, wherein the terminal device groups comprise at least one of a personal computer, a television, a personal digital assistant device, a smart phone, and a mobile phone.

8. The method accordion to claim 7, wherein the terminal device groups comprise at least one subgroup.

9. The method according to claim 1, further comprising naming media cells in different layouts uniformly in different terminal device groups, thus enabling simultaneous content changes in these terminal device groups when editing one terminal, device group.

10. The method according to claim 1, further comprising issuing a suggestion notification if content does not fit into the media cell, content is missing from the layoutor the layout is missing a name.

11. The method according to claim 1, further comprising, when importing image content into the media cell, using a crop function to show the area that is to be cropped into the media cell.

12. The method according to claim 1, further comprising receiving a page request from a terminal device, and providing the terminal device with content optimized for the terminal device in response to the page request.

13. The method according to claim 1, further comprising determining and sending a right layout size to a terminal device based on the following determination sequence:
   i) determining the right layout size based on a terminal database;
   ii) determining the right layout size based on a phone manufacturer's database;
   iii) determining a default layout to be sent to mobile terminals if it is not possible to determine the right layout size based on the terminal database or the phone manufacturer's database.

14. The method according to claim 13, wherein the sending step comprises sending, to the terminal device, the default layout with at least one option to choose a different layout size with the terminal device.

15. The method according to claim 13, wherein before sending the right layout size to the terminal device the method further comprises converting at least one media cell into a picture format.

16. A server for optimizing content delivered to a variety of terminal devices, the server being configured to perform a method for optimizing content delivered to a variety of terminal devices, the method comprising the steps of:
  prior to providing content to a terminal device,
  creating a plurality of terminal device groups;
  determining dimensions for each of the terminal device groups, each of the terminal device groups having a terminal device group specific active display area limit;
  assigning terminal devices to the terminal device groups based on active display areas of the terminal devices;
  creating, for each of said terminal device groups, a respective different terminal device group specific layout for each page;
  creating at least one media cell within each said terminal device group specific layout; and
  determining properties for each said media cell, the properties determining size limits for the media cell and how the media cell is allowed to adapt within the respective said terminal device group specific layout; and then
  providing content into each said media cell and controlling visual representation of the content in the media cell with the respective properties of the media cell.

17. The server according to claim 16, wherein the properties of the media cell further comprises at least one of a name, a content type, content, an image stretch value, grid spans, and margins.

18. The server according to claim 16, wherein the image stretch value represents how much an image is allowed to stretch within the media cell.

19. The server according to claim 16, wherein the server is configured to determine dimensions for the layout, the dimensions comprising smallest and largest size values.

20. The server according to claim 16, wherein the server is configured to determine a layout stretch value for each layout, the layout stretch value representing how much the layout is allowed to stretch outside an active display area of a terminal device.

21. The server according to claim 16, wherein the terminal device groups comprise at least one of a personal computer, a television, a personal digital assistant device, a smart phone, and a mobile phone.

22. The server according to claim 21, wherein the terminal device groups comprise at least one subgroup.

23. The server according to claim 16, wherein the server is configured to name the media cells in different layouts uniformly in different terminal device groups, thus enabling simultaneous content changes in these terminal device groups when editing one terminal device group.

24. The server according to claim 16, wherein the server is configured to issue a suggestion notification if content does not fit into the media cell, content is missing from the layout or the layout is missing a name.

25. The server according to claim 16, wherein the server is configured to import image content into a media cell using a crop function to show the area that is to be cropped.

26. The server according to claim 16, wherein the server is configured to receive, a page request from a terminal device and to provide providing the terminal device with content optimized for the terminal device in response to the page request.

27. The server according to claim 16, wherein the server is further configured to determine and send a right layout size to a terminal device based on the following determination sequence:
  i) to determine the right layout size based on a terminal database;
  ii) to determine the right layout size based on a phone manufacturer's database; and
  iii) to determine a default layout to be sent to mobile terminals if it is not possible to determine the right layout size based on the terminal database or the phone manufacturer's database.

28. The server according to claim 27, wherein the server is further configured to send, to the terminal device, the default layout with at least one option to choose a different layout size with the terminal device.

29. The server according to claim 27, wherein before sending a right layout size to a terminal device the server is further configured to convert at least one media cell into a picture format.

30. A computer program embodied in a non-transient computer readable medium for optimizing content delivered to a variety of terminal devices, wherein the computer program controls a data-processing device to perform the method of claim 1.

* * * * *